United States Patent [19]

Kirby

[11] Patent Number: 4,506,250

[45] Date of Patent: Mar. 19, 1985

[54] STRAIN GAUGE

[75] Inventor: Peter L. Kirby, Newcastle upon Tyne, England

[73] Assignee: Crystalate Electronics Limited, Kent, England

[21] Appl. No.: 377,486

[22] Filed: May 12, 1982

[30] Foreign Application Priority Data

May 16, 1981 [GB] United Kingdom ............... 8115089

[51] Int. Cl.³ .............................................. G01L 1/22
[52] U.S. Cl. .................................... 338/5; 29/610 SG
[58] Field of Search ........................................ 338/2–5; 29/610 SD; 73/862.65

[56] References Cited

U.S. PATENT DOCUMENTS

| 2,837,619 | 6/1958 | Stein | 338/2 |
| 3,705,993 | 12/1972 | Grigorovici et al. | 338/2 |
| 3,719,913 | 3/1973 | Du Bose et al. | 338/2 |
| 3,808,678 | 5/1974 | Kubo et al. | 338/2 X |
| 4,050,976 | 9/1977 | Reiters | 338/2 X |
| 4,311,980 | 1/1982 | Prudenziati | 338/2 X |
| 4,422,063 | 12/1983 | Pryor | 338/2 |

Primary Examiner—C. L. Albritton
Attorney, Agent, or Firm—Pollock, Vande Sande & Priddy

[57] ABSTRACT

A strain gauge or transducer is provided incorporating a supported film electrical resistance element whose electrical resistance varies as a function of applied mechanical strain and is provided with electrically conductive terminals. The resistance element comprises a dispersion of electrically conductive or resistive particles in an organic polymer together with an optional electrically insulating filler material. In a particular embodiment, the resistance element is supported on a member of anodized aluminum.

21 Claims, 1 Drawing Figure

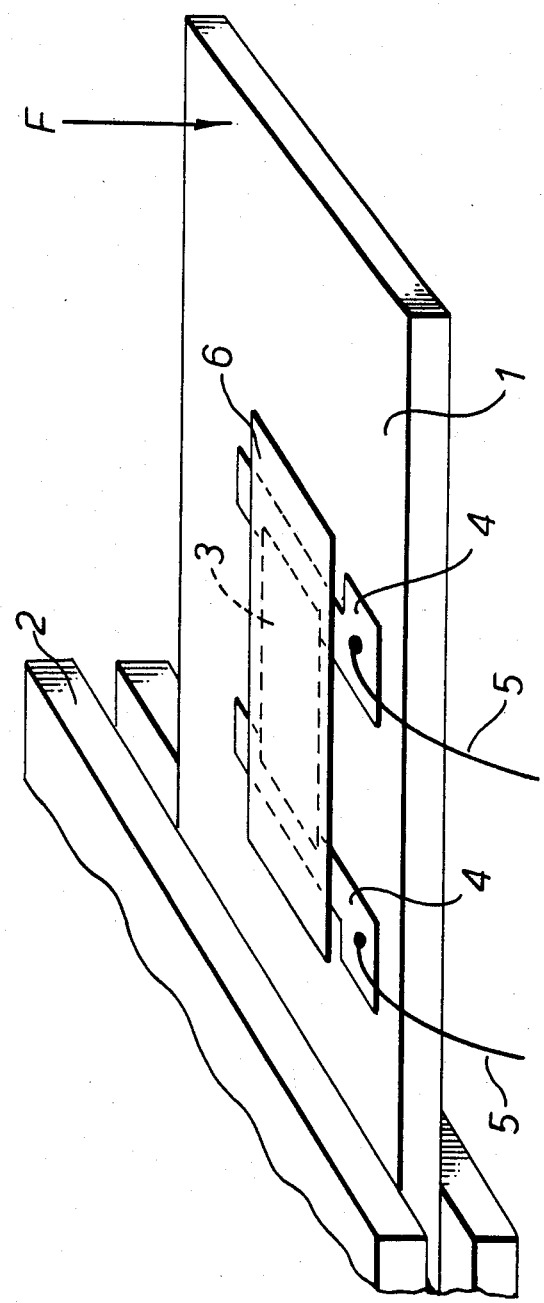

STRAIN GAUGE

FIELD OF THE INVENTION

This invention relates to an electrical resistance strain gauge or transducer incorporating a novel electrical resistance element.

BACKGROUND TO THE INVENTION

Strain gauges based on piezo-resistance effect, are well known. Metal and alloy wires were used as an early form of strain gauge and more recently, thin sheets of metal or foil bonded to the surface of an object in which the strain is to be measured, or thin films evaporated onto the surface of such an object, or thin pieces of semiconductor material bonded onto such a surface have all been used. All of these devices are capable of providing accurate and repeatable indications of the magnitude of both tensile and compressive strain on the surface of an underlying supporting member. Such devices are widely used in the field of precision engineering for strain measurement or stress analysis or in the manufacture of high quality transducers such as load cells or force or pressure transducers for the measurement of force, pressure or weight. Sophisticated industrial weighing systems and weighing platforms and expensive weighing machines or scales used in trade or commerce are provided for by these known devices which can frequently measure to an accuracy of 0.1% or better under all required operating conditions. Such devices do not, however, provide a solution to the need for low cost simple forms of force (including load, weight or pressure) measuring transducers as are required in units such as kitchen or bathroom scales, or for simple industrial control purposes or various applications in machinery or, for example, in automobiles where accuracies and repeatabilities of the order of 1.0% would generally suffice.

SUMMARY OF THE INVENTION

An object of the present invention is to satisfy this need and provide an inexpensive strain gauge or transducer of simple design, made from inexpensive starting materials and which is simple to make in large volume.

The present invention provides a strain gauge or transducer incorporating a supported film electrical resistance element whose electrical resistance varies as a function of applied mechanical strain and provided with electrically conductive terminals, said element comprising a dispersion of electrically conductive or resistive particles in an organic polymer. A proportion of electrically insulating filler material may optionally be included in said element.

DESCRIPTION OF PREFERRED FEATURES

The said conductive terminals are preferably arranged to lie under or over peripheral regions of said element and are preferably of film form. The said film electrical resistance element is suitably supported on and adhered to an electrically insulating or insulated supporting member. The said supporting member may be of thin flexible material, said gauge or transducer being thereby adapted to enable it to be bonded or secured to a structure or component to be subjected to mechanical strain. An adhesive may be used to bond said supporting member of thin flexible material to said structure or component.

Alternatively the supporting member may comprise glass, ceramic or organic plastics or may comprise metal or metal alloy provided with a thin film of electrically insulating material in the region where said element and terminals are supported. The member may be in the form of a diaphragm, beam, bar, cylinder or other complex shape in which mechanical strain induced therein or imparted thereto is to be monitored.

An organic plastics material is especially convenient for use as said supporting member because of the ease with which complex shapes or structures which may be required for various transducer applications can be produced using simple forming or moulding techniques.

When a metal or alloy supporting member is used, this suitably comprises aluminum, bronze or steel. The said film of electrically insulating material on said metal or alloy member may comprise an organic polymer, lacquer, resin, tape or foil. Alternatively, when said supporting member comprises aluminum, or an alloy thereof, a preferred film of electrically insulating material is provided in well known manner by anodizing the surface of said member at least in the region where the element and terminals are supported. If desired, the anodized surface may be covered with a very thin electrically insulating layer formed by application of a highly fluid organic resin which is subsequently cured or polymerized, said resistance element and terminals being supported on and adhered to the covered surface. By this means, problems arising from any pinholes in the anodized surface are minimized.

Aluminum is advantageous for use as the supporting member because of the ease with which thin adequately insulating layers can be produced by well known anodization techniques and because the electrical film resistance elements after application to the anodized layer can be stoved and polymerized at a sufficiently high temperature to ensure their maximum stability thereafter as strain sensing devices. The anodized layer will preferably be fabricated free from pinholes and of a thickness such that its electrically insulating strength is sufficient to withstand, and provide an adequate margin of safety over, the voltages which will be applied to the electrical film resistance elements and their associated film conductors. It is sometimes considered difficult to ensure absolutely the absence of pinholes in an anodized layer and in this case the application of the very thin layer of organic resin effectively acts as a sealing material to fill in any pinholes which may exist. Such organic resin is applied in a very fluid form in as thin a coating as possible as its purpose is not to increase the average thickness of the anodized insulating layer but only to fill in any imperfections which may exist in that layer.

The electrical film resistance element is, as in the case of bonded foil resistance strain gauges, conveniently but not necessarily attached to a flat portion of the surface of the supporting member.

Electrical resistance elements comprising a dispersion of electrically conductive or resistive particles in an organic polymer are known per se as are compositions used in their manufacture. Such compositions are usually applied to a support as an ink or paste which may contain a solvent and may be heated to effect polymerization. In the present invention an element having a surface resistance of between 100 ohms per square and 10,000 ohms per square has been found to be particularly suitable. Suitably said element includes from 5 to 60% by weight of said conductive or resistive particles and from 0 to 75% by weight of electrically insulating filler material. A particularly suitable composition of said element is a dispersion of carbon particles in an organic polymer. The said organic polymer is suitably selected from epoxy, alkyd, polyester, acrylic or silicone materials or copolymers thereof. Suitably the resistive element and its terminals are formed by screen printing, dipping, or spraying onto the support a resistive element-forming or a terminal-forming composition and the coated support is then preferably heat treated to optimize the electrical properties of the resulting transducer.

The electrical resistance value, measured between the terminals of the resistance element, can be adjusted to a desired value. This is preferably achieved by abrasion or compaction of the outermost surface of the element.

A protective covering of electrically insulating material may also be provided for said element. Such covering conveniently comprises a pressure-sensitive adhesive tape. Alternatively a layer of an organic lacquer which does not significantly interact with said organic polymer may be provided as said protective covering. Final trimming to reduce the resistance value of said element may be effected by rubbing the surface of said protective covering to cause permanent compaction of said element.

The preferred compositions used in fabricating the electrical film resistance element comprise a dispersion of conductive or resistive particles and possibly particles of a filling material in an organic resin. Such compositions have been used to make hybrid film circuits in association with conducting films also deposited on and adherent to the insulating substrate. Such electrical film resistance elements have been described as conductive polymer resistors. These resistance elements have also found application as tracks in rotary or linear potentiometers, these being sometimes referred to as conductive plastic potentiometers.

The fabrication of the required compositions is not complex and is well known in the art. The proportions of conducting particles, usually carbon, may range from 5 to 60% by weight. The proportions of insulating filler may range from 0 to 75% by weight and a solvent may be added to facilitate application of the composition. The organic resin constituting the residual proportion of the composition may be selected from any of the commonly available organic resins including epoxies, alkyds, polyesters, acrylics, silicones etc., or copolymers thereof, which in fluid form may constitute the carrier for mixing with the conductive or resistive particles, optional insulating particles, and solvent in the production of an ink or paste adapted for application by dipping, spraying or silk screen printing to an insulating substrate. The printed or deposited resistance material is then dried in air, allowing substantial evaporation of the solvent constituent followed by a stoving treatment which may typically occur between 100° and 250° C. bringing about a drying, hardening and at least partial polymerization of the organic resin. The stoving treatment is continued for a time and at a temperature which ensures that the resultant electrical film resistance element possesses adequate hardness, permanence and electrical stability. Although the use of such compositions for the manufacture of solid carbon composition resistors, conductive plastic potentiometers and conductive polymer film circuits, is well known and the manufacturers of thick film cermet inks and pastes also supply inks and pastes for the fabrication of conductive polymer resistors, it has not, however, been known to use such materials for the fabrication of strain sensitive deposited film resistance elements. I have found that by an appropriate selection of materials and processing conditions, these available materials can be fabricated in such a form as to provide low cost strain sensitive elements of sufficient sensitivity and stability to provide useful application in the manufacture of low cost transducers.

I have found that with the use of the said resistance element in strain gauges or transducers of the present invention, gauge factors of between about 2 and 5 are demonstrated. Changes in resistance which are observed in the element have been found to accurately and repeatably provide a measure of tensile and compressive strain occurring in the element and transmitted thereto by the supporting member.

BRIEF DESCRIPTION OF THE DRAWING

The invention will now be described by way of example with reference to the accompanying drawing which shows a perspective view of an embodiment of transducer according to the invention.

DETAILED DESCRIPTION OF A PREFERRED EMBODIMENT

A supporting member 1 is designed and fabricated in aluminum metal or an alloy thereof, in such a form that it provides the necessary transducer element in an intended force measuring transducer, the term "force" used herein and in the appended claims including load, weight and pressure. The member 1 is shown to be in the form of a simple beam of rectangular section firmly clamped at one end in a member 2 in a cantilever configuration.

There are, however, many other shapes and configurations for the supporting member well known in the art of transducer design. For example, the member could be in the form of a thin diaphragm arranged to be deflected by applied fluid pressure and forming part of a pressure transducer. The supporting member will be fabricated by conventional casting, extrusion and machining processes which provide the necessary geometrical accuracies required by the purpose to which the transducer is to be put. These metal fabrication processes will include the provision of a sufficiently smooth surface in the region onto which strain sensitive electrical film resistance elements are to be deposited. The aluminium or aluminium alloy supporting member is then subjected to an anodizing treatment which may be applied to the whole of its surface but in particular will be directed to the region of the surface onto which the electrical film resistance elements are to be deposited. The anodization process is well known and will be adapted to provide the necessary degree of electrical insulation between electrical film resistance elements and electrical conductive film elements which are subsequently to be deposited thereon. After anodizing, the surface may be further treated by the application of a highly fluid organic resin which is subsequently cured and whose purpose is to fill in any pinholes which the anodisation process may leave. An appropriate resin of low viscosity is epoxy AY18 from CIBA in association with hardener H218 mixed in the proportion of 100 parts by weight resin to 75 parts by weight of hardener with the addition of any appropriate required quantity of methyl ethyl ketone as solvent. The organic resin will not normally be applied unless it is necessary to do so and in any case the quantity of any residual organic film is desirably minimized in order to have the least effect on the total thickness of the anodized aluminum oxide layer and to have minimum interactive effect with the organic resin material in the electrical film resistance element to be deposited on the anodized layer. One or more strain sensing elements, each comprising an electrical resistance element 3 whose electrical resistance varies as a function of applied mechanical strain and provided with electrically conductive terminals 4, are provided on the anodized surface of the aluminium member 1. The or each element 3 is arranged near to the clamped end of the member 1 in the region where maximum surface strain is experienced when the member 1 is deflected by application of a force F at or near the free end. The electrical resistance element 3 is in the form of a film and comprises a dispersion of electrically conductive or resistive particles in an organic polymer.

Carbon is a preferred material for the conductive or resistive particles.

An appropriate electrical resistance composition comprising, for example, a composition selected according to the resistance value required from the RS-150 series manufactured by Electro-Science Laboratories of Pennsauken, N.J., is obtained or fabricated as is well known in the art and applied by the use of an appropriate technique. This may preferably utilize a screen printing process, as is well known, such that the electrical film resistance composition is provided in the form of a screen printable ink which is applied by the action of a squeegee through the interstices of a screen which deposits the electrical film resistance material in defined regions. This process is advantageous in that it facilitates accurate positioning of the resistance element pattern on a selected region of the surface of the supporting member as is required to ensure that the strain to be detected and measured is that which is developed at an appropriate point of the transducer member. Electrical contact to the electrical film resistance element is provided by the application, which may also preferably be carried out by a screen printing process, of the terminals 4 in the form of electrical film conductor elements which may comprise mixtures of conducting powder such as silver and organic resins. Such materials are well known and commonly utilized in conjunction with conductive plastic potentiometer tracks or conductive polymer film resistors and could, for example, be silver-epoxy conductor material type T2100 manufactured by EMD-Cermalloy Inc. of Conshohocken, Pa. Lead wires 5 are secured and electrically connected to the terminals 4, eg. by means of solder.

The conductor pattern may be conveniently delineated and registered by the use of screen printing techniques and may be arranged to overlap the resistance element by deposition either prior to or after the printing of the electrical film resistance element. In either case it is necessary only to dry the first deposited pattern before printing and applying the second deposited pattern after which both the conductor and the resistance elements are stoved and partially polymerized in a single heating process. The heating process may involve periods from a few hours up to about 24 hours in an oven at temperatures of from 100° C. to 250° C. In the case where the supporting member comprises aluminum or aluminum alloy, relatively high temperatures in this range may be selected for the stoving treatment. It must be noted, however, that as higher temperatures are utilized, the stoving process may affect the hardness or elastic parameters of the supporting member 1, and in the case of transducer elements, these are important parameters which may call for the judicious selection of a compromise between the maximized performance of the deposited electrical film resistance element and of the underlying transducer deflection system, as provided by the supporting member.

After the stoving and partial polymerization process, it being noted that polymerization is a state which can only be approached asymptotically and never finally achieved, attention to the resistance value of the electrical film resistance element is required. The selection of the composition used will have been made to provide resistance values of an appropriate aspect ratio in a convenient range between 100 ohms and 10,000 ohms but the value achieved after printing and stoving will probably not conform sufficiently accurately to the required target value. This will particularly be the case if several resistors are produced on the supporting member in the fabrication of a half bridge or a whole bridge configuration. In these cases some form of trimming or adjustment operation will be necessary to ensure that each element in the half-bridge or bridge is matched to within at least 1%, or in certain cases to within 0.1%, of a common value. Normal methods of trimming film resistors include cutting into the film with an abrasive wheel, a jet of fine abrasive particles or a laser beam. None of these methods is satisfactory when a metal or metal alloy supporting member is adopted as they would inevitably result in a cutting through of the insulating layer and exposing the electrically conducting member to the electrical film resistance element in close approximation to each other. It is therefore preferable to bring about adjustment by an overall abrasion of the surface area of the electrical film resistance element. This can be conveniently carried out using a paste comprising fine abrasive particles dispersed in a fluid medium such as a light oil. This has been found to provide adequate adjustment when applied to film resistors including thick film cermet resistors where such abrasion normally results in an increase in the resistance value. However, in the case of conductive polymer resistors, mild abrasion of this nature is generally found to bring about a lowering of the resistance value. It is believed that this is due to the action of the abrasive on the surface of the conductive polymer resistor in which some of the constituent resistive particles, ie. the carbon particles, are smeared over the surface of the resinous matrix causing an increased degree of inter-linkage between the constituent carbon particles and thereby decreasing the resistivity of the surface layers of the film. This is not regarded as a disadvantage and results in a technique in which the higher values of the resistance elements in the half-bridge or bridge are adjusted downwards in value until they equate to the resistance value of the lowest value in the configuration.

If strain sensitive resistance elements in an appropriate configuration are produced in the aforesaid manner, it will be found that they have gauge factors of between about 2.0 and 5.0 and this provides adequate sensitivity in sensing strain or changes of strain in the supporting member. The temperature coefficient of resistance of the film resistor element may lie between $-100$ and $-200$ ppm/°C. and these coefficients may track from one element in the configuration to another sufficiently closely so that there is relatively little apparent strain developed when a multi-element gauge or transducer (ie. incorporating a half bridge or a full bridge) changes temperature. It will, however, be found that the gauges as produced in the aforesaid manner may show some sensitivity to atmospheric humidity at room temperature. This calls for the application of some protective coating but it has been found that the application of a conventional coating of organic lacquer, followed by its stoving and polymerization, may affect the underlying electrical film resistance element. The effect is believed to be due to an interaction between the organic protective material and the organic resin constituent of the resistive film, and may cause changes in parametric values, including the resistance value, to an undesirable extent. It has been found that only very small changes are brought about if an adhesive tape 6 is applied to the electrical film resistance element. A suitable adhesive tape is the type Macutape P4 manufactured by MacDermid of Telford, England. The application of a pressure sensitive tape does not require any high temperature stoving and relatively small changes in resistance value occur on its application. It has further been discovered that the degree of protection from the surrounding atmosphere which such a pressure-sensitive adhesive tape provides, is sufficient for the purposes required here. Low cost transducers of the type involved would usually not be expected to perform at very low temperatures or very high temperatures and would normally operate within the range 20° C. to 40° C. Furthermore, such transducers would generally not be expected to operate in wide ranging atmospheric conditions and particularly not in conditions of high humidity.

The use of a readily available pressure sensitive tape 6 is normally found to provide an adequate protection to the resistance film. If, however, a very small resistance change does occur on the application of the tape, and if it is found that the matching of respective resistance elements in a half-bridge or full bridge configuration has varied one to another, a final close tolerance trimming operation can be carried out by the application of local intense pressure to the outside of the applied tape thereby affecting the underlying electrical film resistance element. It is believed that on application of such pressure, the element undergoes a certain degree of compacting in its structure which brings about a further reduction in resistance value. Such compacting and consequent reduction in resistance value is irreversible and not to be confused with the reversible change in resistance which occurs in the element when subjected to tensile or compressive stress by way of the supporting member. The necessary applied pressure to effect adjustment is suitably achieved by rubbing with a blunt object the outer surface of the protective tape and this process of resistance value adjustment after the application of the protection and the stabilization of the elements so protected, is a particularly attractive and desirable feature of the present invention.

Instead of using a metal such as aluminum for the supporting member for the resistive element, it may be particularly advantageous for some applications to employ a member or organic plastics material. An example of such an application is in pressure transducers where a supporting member comprising a thin diaphragm, to which fluid pressure is to be applied, and a supporting structure and/or housing therefor may readily be fabricated in organic plastics material by a simple forming process such as transfer moulding.

I claim:

1. A force measuring transducer comprising:

a low deformation supporting member to which is applied the force to be measured, said supporting member having an electrically isolated surface;

an electrical resistance element in the form of an elongated film coated directly onto said isolated surface of said supporting member so that its electrical resistance varies as a function of longitudinal tensile and compressive strain therein resulting from mechanical strain induced in the supporting member, said film having an electrical resistance of from 100 ohms to 10,000 ohms per square and comprising conducting particles in a polymerized organic resin, said electrical resistance element having been heated to a temperature from 100° C. to 250° C. to polymerize the resin and electrically stabilize the film; and electrical film conductors coated directly onto said isolated surface of said supporting member and defining terminals leading from opposed ends of said resistance element to provide electrical contact thereto.

2. A transducer according to claim 1 in which a proportion of electrically insulating filler material is included in said electrical resistance element.

3. A transducer according to claim 1 in which said conductive terminals overlie peripheral regions of said resistance element.

4. A transducer according to claim 1 in which said supporting member is fabricated of a low deformation material selected from the group consisting of glass, ceramics, organic plastics and metals, said supporting member when fabricated from a metal being provided with a thin film of electrically insulating material in the region where said resistance element and terminals are supported.

5. A transducer according to claim 4 in which said supporting member is fabricated of a metal selected from the group consisting of aluminum, bronze, steel and alloys thereof.

6. A transducer according to claim 5 in which said film of electrically insulating material is selected from the group consisting of organic polymers, lacquers, resins, tapes, and foils.

7. A transducer according to claim 5 in which said supporting member is fabricated of a metal selected from the group consisting of aluminum and alloys thereof, said film of electrically insulating material comprising an anodized surface of said supporting member at least in the region where said resistance element and terminals are supported.

8. A transducer according to claim 7 in which said anodized surface is covered with a very thin electrically insulating layer formed by application of a highly fluid organic resin which is subsequently cured, said resistance element and terminals being supported on and adhered to the covered anodized surface.

9. A transducer according to claim 8 in which said very thin insulating layer serves only to fill in any imperfections existing in said anodized surface.

10. A transducer according to claim 1 in which said electrical film resistance element is attached to a flat portion of said isolated surface of said supporting member.

11. A transducer according to claim 1 in which said film resistance element comprises from 5 to 60 percent by weight of said conducting particles, and from 0 to 75 percent by weight of an electrically insulating filler material.

12. A transducer according to claim 11 in which said film resistance element comprises a dispersion of carbon particles in an organic polymer.

13. A transducer according to claim 12 in which said organic polymer is selected from the group consisting of epoxy, alkyd, polyester, acrylic and silicone materials, and copolymers thereof.

14. A transducer according to claim 1 further comprising a protective covering of electrically insulating material overlying said resistance element.

15. A transducer according to claim 14 in which said protective covering comprises a pressure-sensitive adhesive tape.

16. A transducer according to claim 14 in which said protective covering comprises a layer of organic lacquer which does not significantly interact with said organic polymer.

17. A method of making a force-measuring transducer comprising the steps of:
  providing a low deformation supporting member to which a force to be measured is applied, said supporting member having an electrically isolated surface;
  coating an elongated region of said isolated surface with a material comprising conducting particles in an organic resin in an amount such that an eventual electrical resistance film formed from said material will have a resistance of from 100 to 10,000 ohms per square;
  coating electrical film conductors directly onto said isolated surface of the supporting member to define terminals leading from the opposed ends of the resistance film to provide electrical contact thereto; and
  heating said coated supporting member at a temperature of from 100° C. to 250° C. to convert said material into a hardened resistance film.

18. A method according to claim 17 wherein said material is a liquid which is deposited on said supporting member by screen printing.

19. A method according to claim 18 further comprising adjusting the electrical resistance value measured between said terminals of said resistance film to a desired value by abrasion of the outermost surface of said element.

20. A method according to claim 18 further comprising adjusting the electrical resistance value measured between said terminals of said resistance film to a desired value by compaction or the outermost surface of said element.

21. A method according to claim 17 further comprising depositing a protective covering of electrically insulating material over said resistance film, and trimming said resistance film to reduce its resistance value by rubbing the surface of said protective covering to cause compaction of said resistance film.

* * * * *